United States Patent Office 3,544,581
Patented Dec. 1, 1970

3,544,581
PRODUCTION OF 6-AMINO-PENICILLANIC ACID SULFOXIDE
John M. Essery, Liverpool, N.Y., assignor to Bristol-Myers Company, New York, N.Y., a corporation of Delaware
No Drawing. Filed July 22, 1965, Ser. No. 474,156
Int. Cl. C07d 99/16, 99/24
U.S. Cl. 260—306.7        3 Claims

ABSTRACT OF THE DISCLOSURE

A general procedure for the direct preparation of penicillin sulfoxides comprises the use of sodium metaperiodate in aqueous solution at pH 6.5–7.0 to produce the sulfoxides of 6-aminopenicillanic acid and seven penicillins.

---

This invention relates to an improved process for the production of penicillin sulfoxides and to the useful antibacterial agent and chemical intermediate 6-aminopenicillanic acid sulfoxide.

The sulfoxides of benzylpenicillin and phenoxymethylpenicillin have been prepared by a three-stage procedure comprising esterification of the carboxyl function followed by oxidation with sodium meta-periodate[1] or hydrogen peroxide[2], and subsequent removal of the protecting group by hydrogenolysis. It was the object of the present invention to provide a general procedure for the *direct* preparation of penicillin sulfoxides.

The object of the present invention was achieved by the provision, according to the present invention, of the process of producing a penicillin sulfoxide (or 6-aminopenicillanic acid sulfoxide) which comprises mixing in aqueous solution at about pH 6.0–7.5 (and preferably about pH 6.5–7.0) and preferably at about 10–40° C. (in preferably approximately equimolar amounts) a penicillin (or 6-aminopenicillanic acid) and a water-soluble meta-periodate (and preferably an alkali metal meta-periodate, e.g. sodium meta-periodate) and then recovering the penicillin sulfoxide (or 6-aminopenicillanic acid sulfoxide) produced thereby.

There is further provided according to the present invention the useful chemical intermediate 6-aminopenicillanic acid sulfoxide.

The penicillin (or 6-aminopenicillanic acid) is used in the process of the present invention in the form of its free acid or of one of its water-soluble salts, e.g. sodium, potassium.

The following consolidated examples will serve to illustrate the present invention but not limit it as this is a general procedure.

General procedure for the preparation of penicillin sulfoxides

A solution of the penicillin salt or free acid (0.10 mole) in the minimum volume of water at pH 7.5–8.0 was added to a solution of 23.5 g. (0.11 mole) of sodium meta-periodate ($NaIO_4$) in 750 ml. of water. The pH of the mixture was adjusted to 6.5–7.0 and maintained at this value while the solution was stirred at room temperature for 2.5 hrs. The pH was then lowered to 2–2.5 by addition of 40% phosphoric acid and the product was isolated as indicated in Table 1 below in one of the following three ways: (a) the precipitated sulfoxide was collected, thoroughly washed with cold water, dried by suction and recrystallized from an acetone-water mixture; (b) the gummy solid which separated was extracted into ethyl acetate, and the washed and dried extract was treated with a molar equivalent of a 50% solution of either potassium or sodium 2-ethylhexanoate in n-butanol. The alkali metal salt thus precipitated was collected and recrystalized from an n-butanol-water-mixture; (c) the acidic aqueous solution was extracted with a solution of 600 ml. of methyl isobutyl ketone containing 33.3 g. (0.075 mole) of dioctyl sodium sulfosuccinate ("Aerosol OT"). The organic phase

TABLE 1.—PENICILLIN SULFOXIDES

| Sulfoxide | Molecular formula | Yield, percent | M.P., °C. (dec.) | Isolation method | Calc'd C | Calc'd H | Found C | Found H |
|---|---|---|---|---|---|---|---|---|
| Phenoxymethylpenicillin | $C_{16}H_{18}N_2O_6S$ | 76 | 178–180 | (a) | 52.45 | 4.95 | 52.66 | 5.18 |
| 5-methyl-3-phenyl-4-isoxazolylpenicillin (sodium salt-hemihydrate) | $(C_{19}H_{18}NaN_3O_6S)2.H_2O$ | 36 | 165–167 | (b) | 50.89 | 4.27 | 51.03 | 4.59 |
| D(−)-α-N-carbobenzyloxy-aminobenzylpenicillin-hemihydrate | $(C_{24}H_{25}N_3O_7S)_2.H_2O$ | 52 | 133–135 | (a) | 56.70 | 5.16 | 56.25 | 5.32 |
| D-(−)-α-aminobenzylpenicillin-dihydrate | $C_{16}H_{19}N_3O_5S.2H_2O$ | 25 | 210–212 | (c) | 47.88 | 5.78 | 48.15 | 5.78 |
| 6-phthalimidopenicillanic acid-hemihydrate | $(C_{16}H_{14}N_2O_6S)_2.H_2O$ | 35 | 160–162 | (a) | 51.75 | 4.07 | 51.37 | 4.22 |
| 6-aminopenicillanic acid sesquihydrate | $(C_8H_{12}N_2O_4S)_2.3H_2O$ | 8 | 248–250 | (c) | 37.06 | 5.83 | 37.10 | 5.57 |
| 6-N-carbobenzyloxyamino+penicillanic acid (potassium salt-monohydrate) | $C_{16}H_{17}KN_2O_6S.H_2O$ | 46 | 138.5–140 | (b) | 45.48 | 4.53 | 45.70 | 4.28 |
| 6-triphenylmethylaminopenicillanic acid (potassium salt-hemihydrate) | $(C_{27}H_{25}KN_2O_4S)_2.H_2O$ | 88 | 213–215 | (b) | 62.16 | 5.03 | 62.29 | 5.06 | was dried briefly over magnesium sulfate and then was treated dropwise with triethylamine to pH 5.0. The amorphous product which precipitated was collected and dried in vacuo.

6-aminopenicillanic acid sulfoxide and penicillin sulfoxides produced by the process of the present invention are effective antibacterial agents, especially versus Gram-positive bacteria and are thus useful in the laboratory as applied, for example, to glassware to destroy contaminating organisms at concentrations in aqueous solution as low as 100–200 p.p.m.

6-aminopenicillanic acid sulfoxide and penicillin sulfoxides are particularly useful as chemical intermediates in the synthesis of cephalosporins as illustrated by the following reaction scheme, which is not part of my invention.

---

[1] A. W. Chow, N. M. Hall and J. R. E. Hoover, J. Org. Chem. 27, 1381 (1962).
[2] E. Guddal, P. Morch and L. Tybring, Tetrahedron Letters, No. 9, 381 (1962).

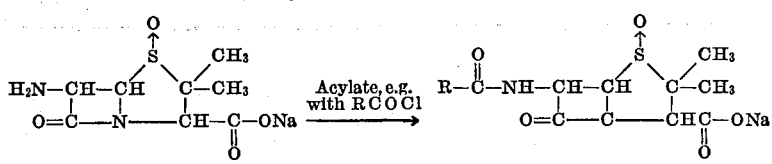

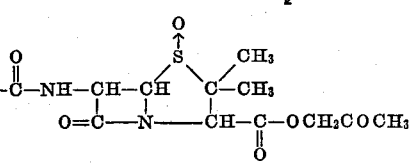

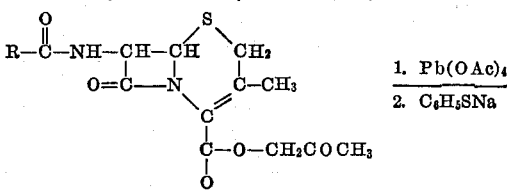

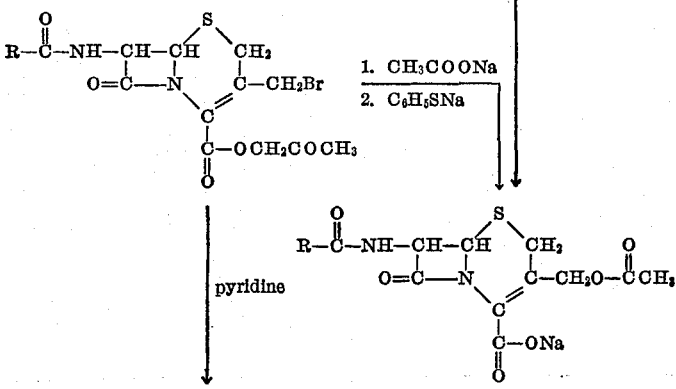

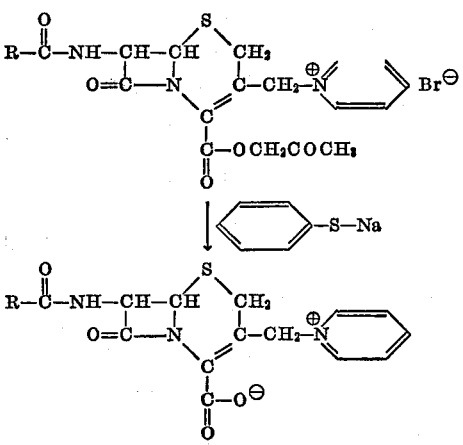

I claim:
1. 6-aminopenicillanic acid sulfoxide.
2. The process of producing 6-aminopenicillanic acid sulfoxide which comprises mixing in aqueous solution at about pH 6.5–7.0 and about 10–40° C. approximately equimolar amounts of 6-aminopenicillanic acid and an alkali metal meta-periodate and then recovering the 6-aminopenicillanic acid sulfoxide produced thereby.
3. The process of producing 6-aminopenicillanic acid sulfoxide which comprises mixing in aqueous solution at about pH 6.5–7.0 and about 25° C. approximately equimolar amounts of 6-aminopenicillanic acid and sodium meta-periodate and then recovering the 6-aminopenicillanic acid sulfoxide produced thereby.

References Cited
UNITED STATES PATENTS 3,047,467  7/1962  Doyle et al. _____ 260—239.1
3,197,466  7/1965  Chow et al. _____ 260—239.1

NICHOLAS S. RIZZO, Primary Examiner

U.S. Cl. X.R.
260—239.1, 243

UNITED STATES PATENT OFFICE
CERTIFICATE OF CORRECTION

Patent No. 3,544,581                    Dated December 1, 1970

Inventor(s)    John M. Essery

It is certified that error appears in the above-identified patent and that said Letters Patent are hereby corrected as shown below:

Table 1, line 2 of the Molecular formula column should read $$(C_{19}H_{18}NaN_3O_6S)_2 \cdot H_2O$$

Table 1, line 9 of Sulfoxide column should read

6-N-carbobenzyloxyamino-penicillanic acid (potassium

Signed and sealed this 20th day of April 1971.

(SEAL)
Attest:

EDWARD M. FLETCHER, JR.          WILLIAM E. SCHUYLER, JR
Attesting Officer                Commissioner of Patents